(12) United States Patent
Bitran

(10) Patent No.: US 8,121,144 B2
(45) Date of Patent: Feb. 21, 2012

(54) MULTI-FUNCTION WIRELESS TERMINAL

(75) Inventor: Yigal Bitran, Ramat HaSharon (IL)

(73) Assignee: Altair Semiconductor Ltd., Hod Hasharon (IL)

( * ) Notice: Subject to any disclaimer, the term of this patent is extended or adjusted under 35 U.S.C. 154(b) by 897 days.

(21) Appl. No.: 11/943,094

(22) Filed: Nov. 20, 2007

(65) Prior Publication Data

US 2009/0129367 A1    May 21, 2009

(51) Int. Cl.
*H04J 1/12*    (2006.01)
*H04H 20/67*   (2008.01)
*H04B 7/00*    (2006.01)
*H04L 12/28*   (2006.01)
*H04L 12/43*   (2006.01)

(52) U.S. Cl. ........ 370/459; 370/201; 370/339; 370/431; 455/41.2

(58) Field of Classification Search .......... 370/229, 370/431, 459, 201, 339; 455/41.2
See application file for complete search history.

(56) References Cited

U.S. PATENT DOCUMENTS

| | | |
|---|---|---|
| 6,130,886 A | 10/2000 | Ketseoglou et al. |
| 6,985,432 B1 | 1/2006 | Hadad et al. |
| 7,133,646 B1 | 11/2006 | Miao |
| 7,133,669 B2 | 11/2006 | Nair et al. |
| 7,289,804 B2 | 10/2007 | Kim |
| 7,363,051 B2 | 4/2008 | Bridgelall |
| 7,406,296 B2 | 7/2008 | Haartsen et al. |
| 7,430,421 B2 | 9/2008 | Park |
| 2002/0136233 A1 | 9/2002 | Chen et al. |
| 2002/0181509 A1 | 12/2002 | Mody et al. |
| 2003/0054788 A1 | 3/2003 | Sugar et al. |
| 2003/0169824 A1 | 9/2003 | Chayat |
| 2004/0029619 A1 | 2/2004 | Liang et al. |
| 2004/0162106 A1 | 8/2004 | Monroe et al. |
| 2005/0020299 A1 | 1/2005 | Malone et al. |

(Continued)

FOREIGN PATENT DOCUMENTS

WO    2008078311 A2    7/2008

OTHER PUBLICATIONS

Altair Semiconductor, "TRIMAX: Coexistence of WiMAX, Bluetooth and WLAN in converged handsets (Non NDS version)", White paper 0012, Revision 1.00, Jul. 2006.

(Continued)

*Primary Examiner* — Marsha D Banks Harold
*Assistant Examiner* — Saad Hassan
(74) *Attorney, Agent, or Firm* — D. Kligler IP Services Ltd.

(57) ABSTRACT

A method for communication includes allocating time intervals for a first communication session over a first connection between a wireless terminal and a base station of a long-range wireless data network, which operates in accordance with a first protocol defining time frames having downlink and uplink sub-frames. Time slots are allocated for a second communication session over a second connection between the terminal and a peripheral wireless device, which operates in accordance with a second, short-range time-slotted protocol, which is different from the first protocol and has a retransmission mechanism. The time slots are synchronized with the downlink and uplink sub-frames defined by the BS. Operation of the second connection is inhibited during some of the time slots that overlap the downlink sub-frames, so as to invoke the retransmission mechanism and cause the terminal to transmit only during the time slots that do not overlap the downlink sub-frames.

14 Claims, 5 Drawing Sheets

U.S. PATENT DOCUMENTS

| | | | |
|---|---|---|---|
| 2005/0025093 | A1 | 2/2005 | Yun et al. |
| 2005/0059347 | A1 | 3/2005 | Haartsen |
| 2005/0101261 | A1* | 5/2005 | Weinzweig et al. ......... 455/74.1 |
| 2005/0128990 | A1 | 6/2005 | Eom et al. |
| 2005/0195786 | A1 | 9/2005 | Shpak |
| 2006/0198476 | A1 | 9/2006 | Palaskas et al. |
| 2006/0221917 | A1 | 10/2006 | McRae |
| 2007/0066359 | A1 | 3/2007 | Zhuang |
| 2007/0076649 | A1 | 4/2007 | Lin et al. |
| 2007/0104145 | A1 | 5/2007 | Jan |
| 2007/0124478 | A1 | 5/2007 | Abdelhamid et al. |
| 2007/0140256 | A1 | 6/2007 | Yaqub |
| 2007/0183383 | A1 | 8/2007 | Bitran et al. |
| 2007/0184798 | A1 | 8/2007 | Bitran et al. |
| 2007/0184835 | A1 | 8/2007 | Bitran et al. |
| 2007/0275746 | A1 | 11/2007 | Bitran |
| 2007/0280096 | A1* | 12/2007 | Yanover et al. ............... 370/201 |
| 2008/0132180 | A1* | 6/2008 | Manicone ....................... 455/83 |
| 2008/0167031 | A1* | 7/2008 | Sorber et al. ............... 455/426.1 |
| 2008/0205365 | A1* | 8/2008 | Russell et al. ................ 370/341 |
| 2008/0233875 | A1* | 9/2008 | Desai et al. ................... 455/41.2 |
| 2009/0054009 | A1* | 2/2009 | Yang et al. ...................... 455/78 |
| 2009/0081962 | A1* | 3/2009 | Sohrabi ............................ 455/79 |
| 2009/0111500 | A1* | 4/2009 | Sudak et al. .................. 455/522 |
| 2009/0285167 | A1* | 11/2009 | Hirsch et al. .................. 370/329 |

OTHER PUBLICATIONS

Tomchik J., "QFDD and QTDD: Proposed Draft Air Interface Specification", IEEE 802.20 Working Group on Mobile Broadband Wireless Access, Qualcomm, Inc., USA, Oct. 28, 2005.

Bluetooth, "Specification of the Bluetooth System: Master Table of Contents & Compliance Requirements: Core Package Version 2.0 + EDR", Nov. 4, 2004.

IEEE Standard 802.16 for Local and metropolitan area networks, "Part 16: Air Interface for Fixed Broadband Wireless Access Systems", Revision of IEEE Standard 802.16-2001, IEEE Computer Society and IEE Microwave Theory and Techniques Society, USA, Oct. 1, 2004.

IEEE Standard 802.16e-2005 for Local and metropolitan area networks, "Part 16: Air Interface for Fixed Broadband Wireless Access Systems; Amendment 2 and Corrigendum 1", Physical and Medium Access Control Layers for Combined Fixed and Mobile Operation in Licensed Bands, Amendment and Corrigendum to IEEE Standard 802.16-2004, IEEE Computer Society and IEE Microwave Theory and Techniques Society, USA, Feb. 28, 2006.

IEEE Inc., "A compilation based on IEEE Standard 802.11-1999 (revision 2003) and its amendments", IEEE Wireless LAN Edition, IEEE Press, USA, 2003.

U.S. Appl. No. 11/647,122 Official Action dated Mar. 13, 2009.

Specification of the Bluetooth System, Master Table of Contents & Compliance Requirements, Nov. 2004.

David Gesbert, et al., "From Theory to Practice: An Overview of MIMO Space-Time Coded Wireless Systems", IEEE Journal on Selected Areas in Communications, vol. 21, No. 3, Apr. 2003.

U.S. Appl. No. 60/772,101.
U.S. Appl. No. 60/820,523.
U.S. Appl. No. 60/772,167.
http://www.ieee802.org/16.
http://www.wimaxforum.org.
http://www.nxp.com/products/connectivity.

"Wireless Performance Optimization Solutions: Bluetooth and 802.11 Coexistence", 2003.

"How 802.11 b/g WLAN and Bluetooth Can Play", Sep. 2005.
U.S. Appl. No. 12/702,332 Official Action dated Aug. 17, 2010.
U.S. Appl. No. 12/426,252 Official Action dated Sep. 9, 2009.
U.S. Appl. No. 11/647,122 Official Action dated Sep. 1, 2009.
International Application PCT/IL2007/001227 Search Report dated Aug. 19, 2009.
U.S. Appl. No. 11/647,122 Official Action dated May 19, 2011.

\* cited by examiner

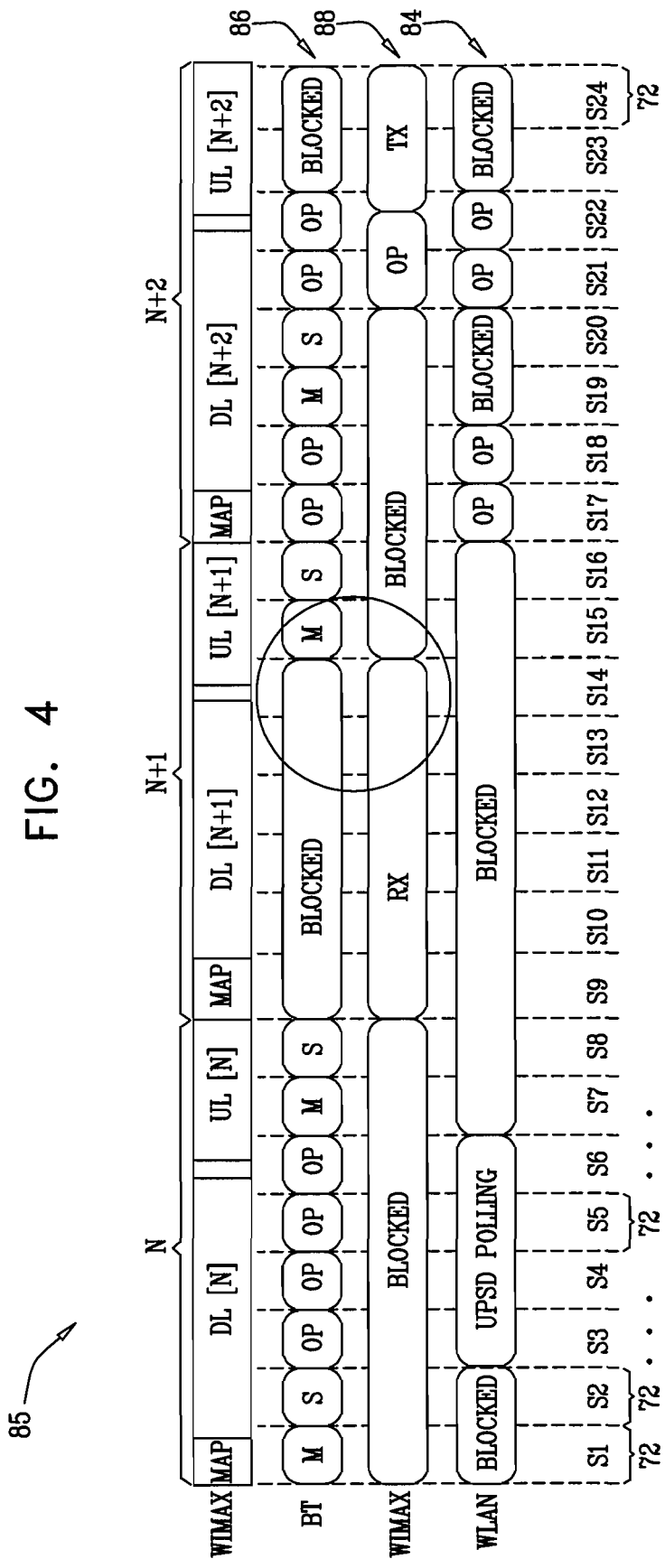

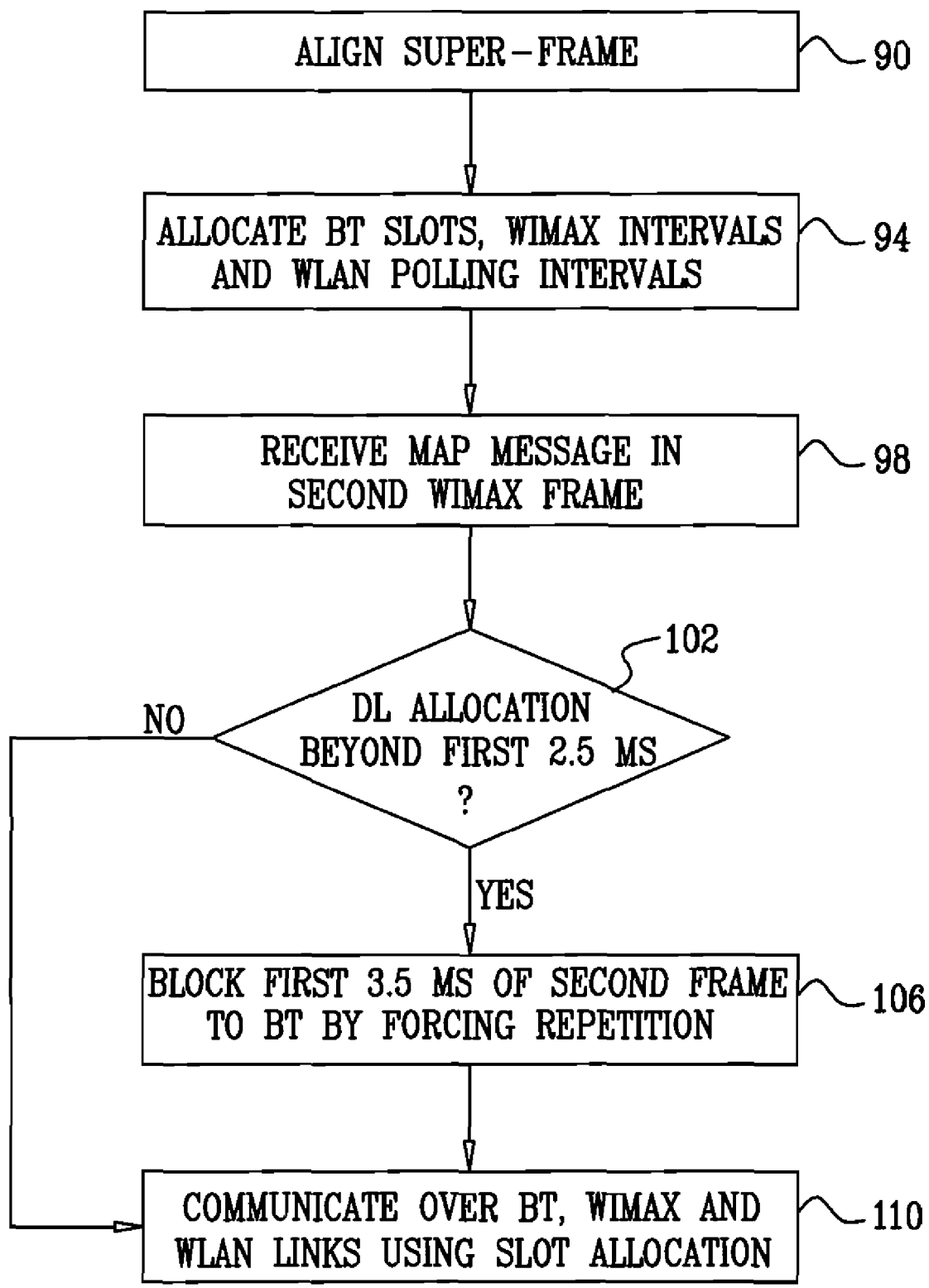

MULTI-FUNCTION WIRELESS TERMINAL

FIELD OF THE INVENTION

The present invention relates generally to wireless communications, and specifically to wireless terminals capable of operating using multiple different communication protocols.

BACKGROUND OF THE INVENTION

Wireless local area networks (WLANs) have gained broad popularity. The original IEEE 802.11 WLAN standard was designed to enable communications at 1-2 Mbps in a band around 2.4 GHz. More recently, IEEE working groups have defined the 802.11a, 802.11b, 802.11e, 802.11g, 802.11n and other extensions to the original standard, in order to enable higher data rates. In the context of the present patent application and in the claims, the term "802.11" is used to refer collectively to the original IEEE 802.11 standard and all its variants and extensions, unless specifically noted otherwise. WLAN is also sometimes referred to as Wi-Fi®.

WiMAX (Worldwide Interoperability for Microwave Access) is a new technology for wireless packet data communications, which is similar in concept to IEEE 802.11, but has a number of enhancements designed to improve performance and range. The original WiMAX standard, IEEE 802.16, specified WiMAX in the 10-66 GHz range. More recently, IEEE 802.16a added support for the 2-11 GHz range, and IEEE 802.16e (approved as IEEE 802.16-2005) extended WiMAX to mobile applications, using an enhanced orthogonal frequency division multiple access (OFDMA) modulation scheme. In the context of the present patent application and in the claims, the term "802.16" is used to refer collectively to the original IEEE 802.16 standard and all its variants and extensions, unless specifically noted otherwise.

Bluetooth® wireless technology is a short-range communication technology intended to replace the cables connecting portable and/or fixed devices while maintaining high levels of security. The latest Bluetooth specification, entitled "Specification of the Bluetooth System, Core Version 2.1+Enhanced Data Rate (EDR)," Jul. 26, 2007, defines a uniform structure for a wide range of devices to connect and communicate with each other. This specification, as well as additional information regarding Bluetooth, is available at www.bluetooth.com. In the context of the present patent application and in the claims, the term "Bluetooth Specification" is used to refer collectively to the Version 2.1 specification, to its variants and extensions and to earlier versions of the specification, unless specifically noted otherwise.

Version 1.2 and later versions of the Bluetooth specification define an operational mode called Extended Synchronous Connection-Oriented (eSCO), which forms a point-to-point link between a master and a specific slave. Bluetooth eSCO links offer limited retransmission of packets. If these retransmissions are required they take place in the slots that follow the reserved slots, otherwise the slots may be used for other traffic.

WLAN, WiMAX and Bluetooth systems often operate in adjacent or overlapping frequency bands, and thus may potentially interfere with one another. This interference is particularly severe when WLAN, WiMAX and/or Bluetooth devices are collocated in a single wireless terminal.

Several methods and devices are known in the art for enabling the coexistence of WLAN and Bluetooth communication in the same wireless terminal. For example, Texas Instruments, Inc. (Dallas, Tex.) offers a hardware and software solution that allows users to run Bluetooth and 802.11a/b/g mobile WLAN simultaneously. The software monitors WLAN and Bluetooth traffic patterns and, when both 802.11 and Bluetooth require bandwidth, the software uses multiplexing techniques to allocate the bandwidth for simultaneous functions. The solution is described in a product bulletin entitled "Wireless Performance Optimization Solutions Bluetooth and 802.11 Coexistence," 2003, which is incorporated herein by reference.

As another example, NXP Semiconductors (Eindhoven, Netherlands) provides another hardware and software solution, which enables Bluetooth and WLAN coexistence using packet transmission arbitration techniques. This solution is described in a white paper entitled "How 802.11b/g WLAN and Bluetooth Can Play," September, 2005, which is incorporated herein by reference.

SUMMARY OF THE INVENTION

Embodiments of the present invention provide a method for communication, including:

allocating time intervals for establishing a first communication session over a first connection between a wireless terminal and a base station (BS) of a long-range wireless data network, which operates in accordance with a first communication protocol that defines a sequence of time frames having respective downlink sub-frames for downlink transmission from the BS to the wireless terminal and uplink sub-frames for uplink transmission from the wireless terminal to the BS;

allocating time slots for establishing a second communication session over a second connection between the wireless terminal and a peripheral wireless device, which operates in accordance with a second, short-range time-slotted communication protocol, which is different from the first protocol and has a retransmission mechanism;

synchronizing the time slots with the downlink and uplink sub-frames defined by the BS;

inhibiting operation of the second connection during some of the time slots that overlap the downlink sub-frames of the first communication protocol, so as to invoke the retransmission mechanism of the second communication protocol and cause the wireless terminal to transmit only during the time slots that do not overlap the downlink sub-frames of the first communication protocol; and concurrently conducting the first and second communication sessions in the allocated time intervals and time slots, respectively.

In some embodiments, the long-range wireless data network includes a WiMAX network that operates in accordance with an IEEE 802.16 standard. Typically, the second connection operates in accordance with an Extended Synchronous Connection-Oriented (eSCO) mode of a Bluetooth Version 1.2 Specification.

In another embodiment, the wireless terminal includes a baseband unit for communicating over the second connection, and inhibiting the operation of the second connection includes inhibiting the baseband unit. In still another embodiment, the wireless terminal includes a Power Amplifier for amplifying Radio Frequency (RF) signals transmitted over the second connection, and inhibiting the operation of the second connection includes inhibiting the PA. Inhibiting the PA may include performing at least one action selected from a group of actions consisting of switching off a supply voltage of the PA, modifying a bias voltage of the PA, switching off an RF input of the PA and switching off an RF output of the PA.

Additionally or alternatively, inhibiting the operation of the second connection may include inhibiting the operation responsively to determining that the BS intends to transmit data addressed to the wireless terminal during the some of the time slots that overlap the downlink sub-frames. In a disclosed embodiment, determining that the BS intends to transmit the data addressed to the wireless terminal includes decoding a downlink allocation message transmitted by the BS.

In some embodiments, the method further includes establishing a third communication session over a third connection with an access point (AP) of a wireless local area network (WLAN) in accordance with a third protocol different from the first and second protocols, during time periods that do not overlap the time slots of the first connection and the time intervals of the second connection, and conducting the third communication session concurrently with the first and second sessions.

There is additionally provided, in accordance with an embodiment of the present invention, a wireless communication terminal, including:

a radio frequency (RF) unit; and a baseband processing circuit, which is coupled to cause the RF unit to transmit and receive signals over the air so as to establish a first communication session over a first connection with a base station (BS) of a long-range wireless data network, which operates in accordance with a first protocol that defines a sequence of time frames having respective downlink sub-frames for downlink transmission from the BS to the wireless terminal and uplink sub-frames for uplink transmission from the wireless terminal to the BS, and to establish a second communication session over a second connection between the wireless terminal and a peripheral wireless device, which operates in accordance with a second, short-range time-slotted communication protocol that is different from the first protocol and has a retransmission mechanism; and a coexistence processor, which is configured to allocate time slots for the second session, to allocate time intervals within the downlink and uplink sub-frames for the first session, to synchronize the time slots with the downlink and uplink sub-frames defined by the BS and to inhibit operation of the second connection during some of the time slots that overlap the downlink sub-frames of the first communication protocol in order to invoke the retransmission mechanism of the second communication protocol and cause the wireless terminal to transmit only during the time slots that do not overlap the downlink sub-frames of the first communication protocol, so as to concurrently conduct the first and second communication sessions in the allocated time intervals and the assigned time slots, respectively.

The present invention will be more fully understood from the following detailed description of the embodiments thereof, taken together with the drawings in which:

BRIEF DESCRIPTION OF THE DRAWINGS

FIGS. 3 and 4 are diagrams showing coexisting allocations of Bluetooth, WiMAX and WLAN time slots in a multi-function wireless terminal, in accordance with an embodiment of the present invention; and FIG. 5 is a flow chart that schematically illustrates a method for multi-function communication in a wireless terminal, in accordance with an embodiment of the present invention.

DETAILED DESCRIPTION OF EMBODIMENTS

Overview

Figure 1:
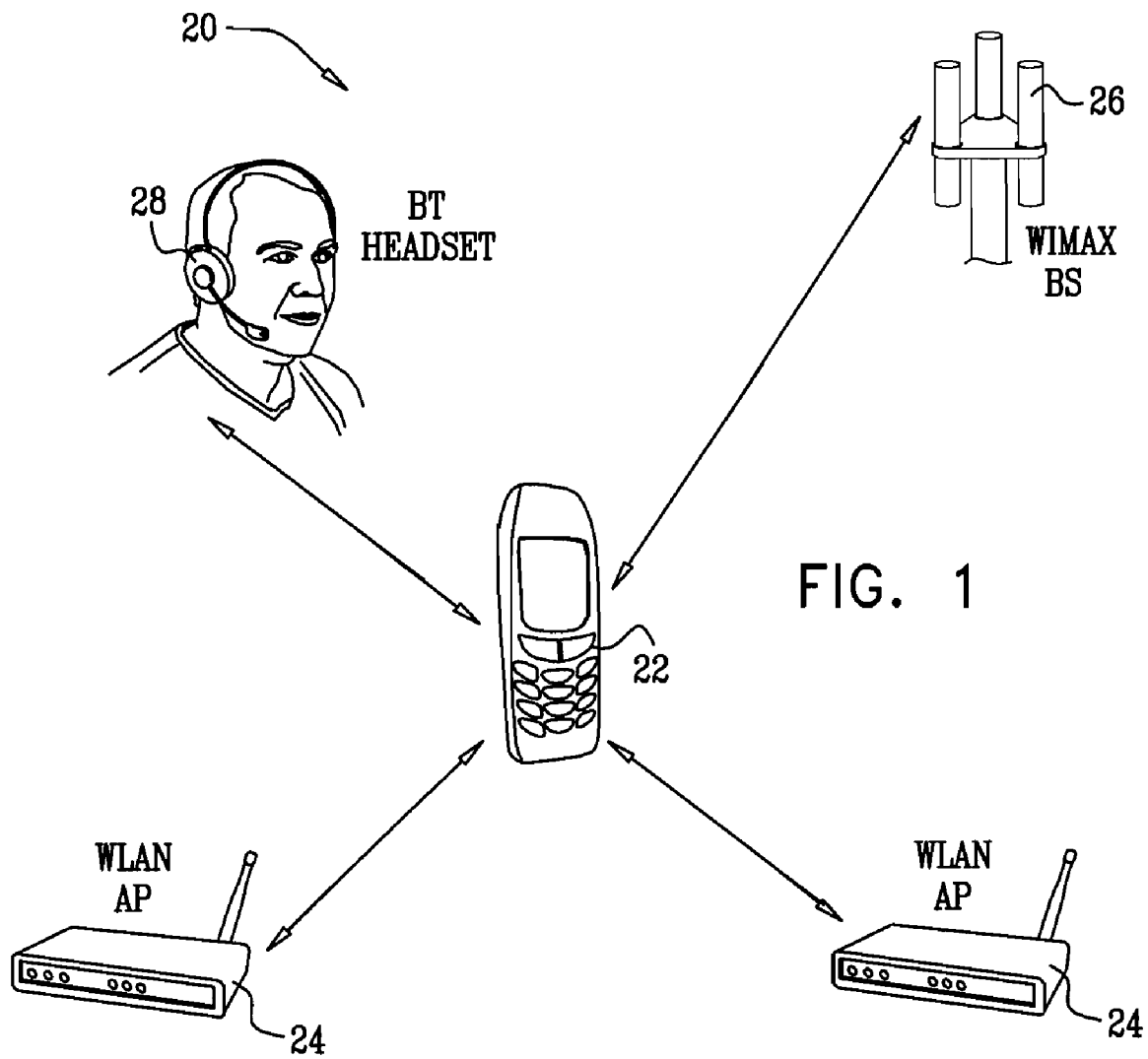
FIG. 1 is a schematic, pictorial illustration showing a system for wireless communications, in accordance with an embodiment of the present invention.

Embodiments of the present invention that are described hereinbelow provide multi-function communication terminals, which can communicate simultaneously with WLAN access points (APs), WiMAX base stations (BSs) and Bluetooth-enabled devices without mutual interference, despite operating in the same or overlapping frequency bands. The wireless terminal typically comprises WLAN, WiMAX and Bluetooth transceivers, as well as a coexistence processor that coordinates the transmission and reception over the different links.

The WLAN, WiMAX and Bluetooth links are coordinated by allocating time slots for the three links in accordance with a predetermined, repetitive super-frame. Since in WiMAX the timing of the link is determined by the BS, the coexistence processor synchronizes the timing of the super-frame, and thus also the timing of the WLAN and Bluetooth links, to the timing of the WiMAX BS with which the terminal communicates.

The slot allocation scheme in the super-frame gives precedence to the Bluetooth link, since the voice overlay profile defined in the Bluetooth protocol has little flexibility in defining slot patterns. The precedence given to Bluetooth transmissions also reduces the latency and jitter of voice traffic that is carried over the Bluetooth link.

WiMAX uplink and downlink intervals are allocated so as to coincide with the uplink and downlink sub-frames of the WiMAX frames, respectively, as determined by the base station. As a result, the terminal is able to receive MAP messages and downlink messages from the BS, and to transmit uplink messages at the appropriate time zones defined by the BS.

In some cases, however, the slot allocation of the super-frame causes the terminal to receive only part of the WiMAX downlink sub-frame transmitted by the BS, for example as a result of allocating more time slots to Bluetooth operation. This sort of allocation constrains the flexibility of the WiMAX BS in constructing the downlink sub-frames. Typically, the BS should be aware of the specific time intervals in which the terminal is able to receive WiMAX downlink transmissions, and to position any messages addressed to the terminal within these intervals. These constraints limit the flexibility of the BS, complicate the downlink sub-frame construction process and may degrade the downlink throughput and performance.

The methods and systems described herein use time slot allocations, which enable multi-function terminals to receive the entire WiMAX downlink sub-frame. Consequently, the WiMAX BS may position messages addressed to such terminals anywhere within the downlink sub-frame, without constraints.

In some embodiments, the terminal is assumed to communicate over the Bluetooth link using the eSCO mode, which has a built-in retransmission mechanism. The coexistence processor of the multi-function terminal inhibits the operation of the Bluetooth link in some of the time slots that overlap the WiMAX downlink sub-frame. As a result, the eSCO retransmission mechanism is automatically triggered, and Bluetooth transmission is automatically deferred to the next time slot.

The coexistence processor may inhibit the Bluetooth link, for example, by applying an inhibit signal to a shutdown input of the Bluetooth baseband unit, by switching off the signals or voltages of the terminal's Power Amplifier (PA), or using any other suitable means.

In some embodiments, the terminal receives and decodes the downlink MAP messages transmitted by the BS, and determines whether the BS intends to transmit messages addressed to the terminal in Bluetooth time slots that overlap the WiMAX downlink sub-frame. If such messages are scheduled, the coexistence processor blocks the appropriate slots to Bluetooth operation and assigns them to WiMAX reception. Otherwise, the coexistence processor assigns the slots to Bluetooth operation.

System Description

FIG. 1 is a schematic, pictorial illustration of a wireless communication system 20, in accordance with an embodiment of the present invention. In system 20, a wireless terminal 22 communicates with one or more WLAN access points (APs) 24 and one or more WiMAX base stations (BSs) 26. In some scenarios, terminal 22 may access the Internet and various network services over either a WLAN or a WiMAX link, and may be handed over from WLAN to WiMAX, and vice versa.

In parallel to communicating with the WLAN and/or WiMAX network, terminal 22 communicates over a Bluetooth link with a peripheral device, such as a headset, a hands-free kit, a personal computing device or any other suitable Bluetooth-enabled device. In the present example, terminal 22 communicates with a Bluetooth-enabled headset 28.

Although FIG. 1 shows a certain type of wireless terminal by way of illustration, the embodiments described hereinbelow are applicable to any type of wireless computing and/or communication device that has the appropriate communication capabilities. The term "wireless terminal" as used in the present patent application and in the claims should therefore be understood broadly to refer to any and all suitable sorts of consumer electronics, computing and communication devices in which the principles of the present invention may be implemented. The wireless terminal may be mobile, portable, nomadic or fixed.

Typically, the WiMAX network to which terminal 22 is connected is a long-range, wide-area network (WAN) having wide geographic coverage. The WLAN network, on the other hand, is usually a local-area network having smaller coverage areas, often referred to as "hotspots." The WLAN hotspots are usually contained within the coverage area of the WiMAX network.

In some scenarios, terminal 22 communicates with both the WLAN and WiMAX networks simultaneously. A typical scenario occurs during handover from one network to the other. In order to ensure a smooth handover, the terminal initiates communication with the network it is about to join before it terminates the connection with the network it is about to leave. Thus, during a certain time interval, the terminal communicates with both networks simultaneously.

Other scenarios in which the terminal communicates with both networks simultaneously occur when the terminal scans one network while communicating with another. For example, the terminal may scan the WLAN while communicating with the WiMAX BS, in order to check whether high-bandwidth communication with the WLAN is available.

In parallel to WLAN and/or WiMAX operation, terminal 22 communicates with headset 28 over a Bluetooth link. For example, when the terminal is engaged in a voice call over either the WLAN or the WiMAX network, the voice is transmitted to and from headset 28. As another example, terminal 22 may be engaged in a data session, such as a Voice over IP (VoIP) session, over the WLAN or the WiMAX network, with the session being relayed to an adjacent laptop or other computing device using a Bluetooth link.

In all of these scenarios, as well as various other possible scenarios, there are occasions when all three communication connections (WiMAX, WLAN and Bluetooth) are being used simultaneously. For example, the terminal may be handed over from the WLAN to the WiMAX network or vice versa, during a voice call that uses headset 28. At other times, the terminal may hold a call over one network, relay the voice or data of the call to the Bluetooth device, while simultaneously scanning the other network.

Thus, there exist various scenarios in which terminal 22 communicates over the WLAN, the WiMAX network and the Bluetooth link simultaneously. On the other hand, all three protocols often operate in similar, sometimes overlapping frequency bands, such as in the 2.3-2.7 GHz band. Unless strictly coordinated, WLAN, WiMAX and Bluetooth transmissions may severely interfere with one another, especially when their transmitters and receivers are collocated in a single communication terminal.

Interference would occur, for example, if the terminal were to transmit using two or more different protocols at the same time, or transmit using one protocol while attempting to receive using another protocol. The methods and systems described herein coordinate the timing of transmission and reception of terminal 22 over the WLAN, WiMAX and Bluetooth links. As a result, wireless terminal 22 is able to communicate with WLAN AP 24, WiMAX BS 26 and Bluetooth 28 simultaneously without mutual interference.

Exemplary methods and wireless terminals that enable coexistence between WiMAX, WLAN and Bluetooth links are described in U.S. patent application Ser. No. 11/647,122, filed Dec. 27, 2006, which is assigned to the assignee of the present patent application and is incorporated herein by reference.

As will be shown below, terminal 22 communicates over a single link out of the three at any given time. The simultaneous operation of the different protocols is carried out by using the different protocols in alternate time slots in a coordinated manner. Thus, the term "simultaneous communication," as used in the present patent application and in the claims, refers to the ability to maintain simultaneous and uninterrupted communication connections, processes or sessions over the WiMAX, WLAN and Bluetooth links, without mutual interference among these processes.

Figure 2:
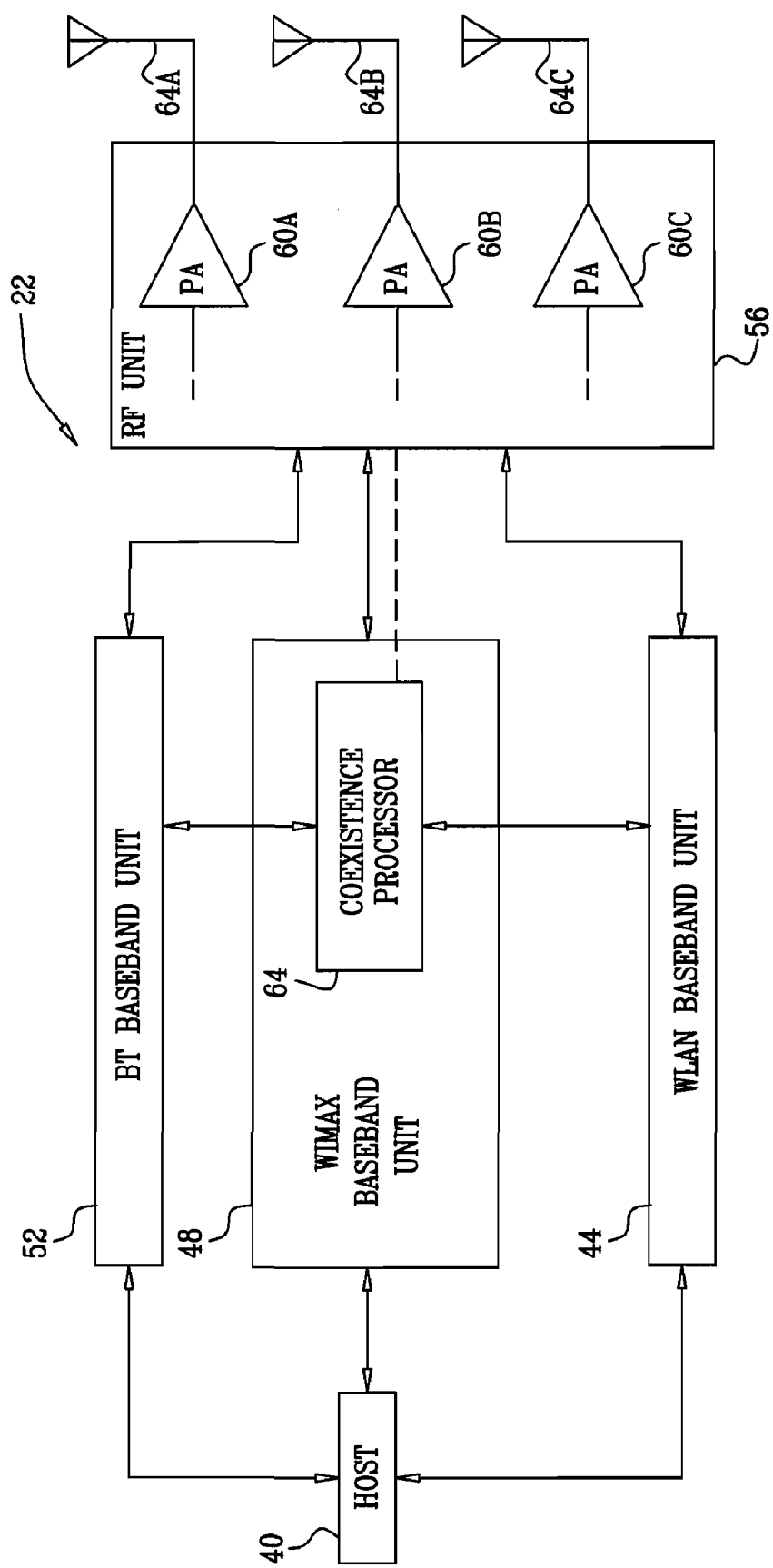
FIG. 2 is a block diagram that schematically shows elements of a multi-function wireless terminal, in accordance with an embodiment of the present invention.

FIG. 2 is a block diagram that schematically shows elements of wireless terminal 22, in accordance with an embodiment of the present invention. Terminal 22 comprises a host processor 40, which is connected to a WLAN baseband unit 44, a WiMAX baseband unit 48 and a Bluetooth baseband unit 52. Baseband units 44, 48 and 52 respectively carry out the WLAN, WiMAX and Bluetooth baseband processing functions. All three units are connected to a radio frequency (RF) unit 56, which comprises the RF receiver and transmitter circuitry for transmitting and receiving the signals of the different protocols. In particular, the RF unit comprises Power Amplifiers (PA) 60A . . . 60C, which amplify the transmitted WLAN, WiMAX and Bluetooth signals, respectively. PAs 60A . . . 60C are respectively connected to antennas 64A . . . 64C, which transmit and receive RF signals of the three protocols to and from the WLAN AP, WiMAX BS and Bluetooth peripheral device. Although the figure shows a typical configuration in which the three protocols use separate PAs and antennas, alternative configurations in which two or more protocols share the same PA and/or the same antenna are also feasible.

Terminal 22 comprises a coexistence processor 64, which coordinates and synchronizes the WLAN, WiMAX and Bluetooth communication of the terminal. In the example of FIG. 2, processor 64 is part of WiMAX baseband unit 48. Alternatively, the coexistence processor may comprise a separate unit, or be integrated with any other component of terminal 22. Further alternatively, the functionality of the coexistence processor may be distributed between two or more baseband units.

The configuration of terminal 22 shown in FIG. 2 is an exemplary configuration, which is shown purely for the sake of conceptual clarity. The methods and systems described herein are applicable in any other suitable terminal configuration. For example, the WLAN, WiMAX and Bluetooth baseband units may comprise separate devices or be integrated into a single device. The RF unit may comprise a single module that serves all three protocols, or may comprise three separate RF modules, one module serving each protocol. Further alternatively, the terminal may comprise three separate RF/baseband units, each serving a single protocol and comprising both baseband and RF elements. Regardless of the specific configuration of terminal 22, the three baseband units can be viewed collectively as a single baseband processing circuit, which carries out the baseband functions of coordinated WLAN, WiMAX and Bluetooth operation.

In some embodiments, the terminal may comprise known WLAN and Bluetooth baseband devices that use a known WLAN/Bluetooth coordination scheme, such as the schemes cited in the Background section above. These coordination schemes typically synchronize the WLAN and Bluetooth protocols using proprietary interfaces between the WLAN and Bluetooth baseband units. In these embodiments, coexistence processor 64 can be connected between the WLAN and Bluetooth baseband units, as shown in FIG. 2, and be configured to emulate the proprietary interfaces between them. Using this configuration, WLAN, WiMAX and Bluetooth coordination can be implemented substantially without modification to the WLAN and Bluetooth baseband units.

The WLAN, WiMAX and Bluetooth baseband units may be implemented in hardware, such as using one or more application-specific integrated circuits (ASICs). Some baseband functions may also be implemented in software. The RF unit may be implemented using radio frequency integrated circuits (RFICs) and/or discrete components. In some embodiments, coexistence processor 64 may comprise a general-purpose processor, which is programmed in software to carry out the functions described herein. The software may be downloaded to the processor in electronic form, such as over a network. Alternatively, the functions of processor 64 may be implemented in hardware, or using a combination of hardware and software elements.

In some cases, some of the circuitry of RF unit 56 can be shared between two or more of the WLAN, WiMAX and Bluetooth transceivers. Alternatively, each transceiver may use its own dedicated RF hardware. Some aspects of sharing the transceiver resources of a wireless terminal among different protocols are described, for example, in U.S. patent application Ser. No. 11/638,629, filed Dec. 12, 2006, which is assigned to the assignee of the present patent application and is incorporated herein by reference.

Coexisting Bluetooth, WiMAX and WLAN Slot Allocations

In order to avoid interference between the WLAN, WiMAX and Bluetooth transmission and reception, terminal 22 transmits and receives in a predefined sequence of time slots, which is described in detail below. The embodiments described herein primarily address steady-state operation, in which the terminal has already established its connection with the appropriate WLAN AP, WiMAX BS and Bluetooth device. Coexistence measures used in other operational modes and processes, such as various link establishment and hand-over procedures, are described in U.S. patent application Ser. No. 11/647,122, cited above.

Figure 3:
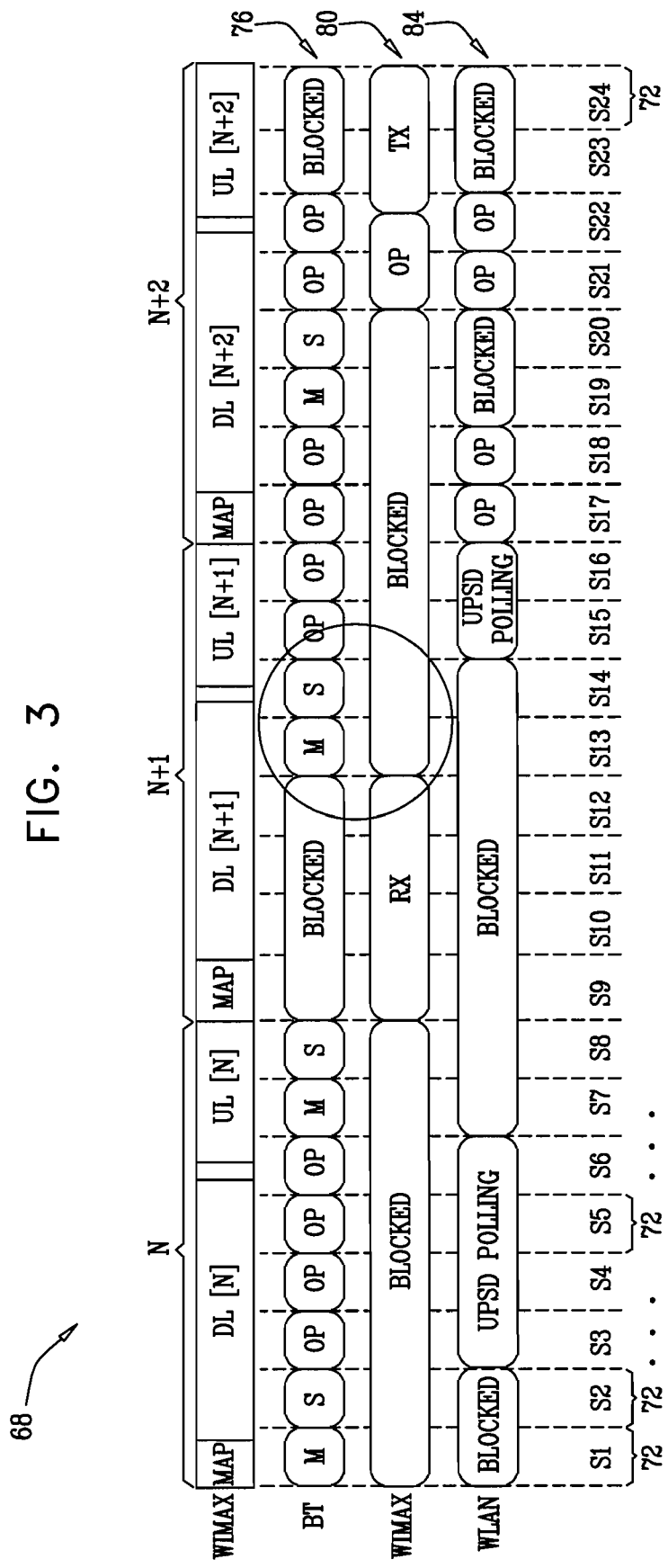

FIGS. 3 and 4 are diagrams showing coexisting allocations of Bluetooth, WiMAX and WLAN time slots in terminal 22, in accordance with an embodiment of the present invention. When the WiMAX, WLAN and Bluetooth links are already established, Bluetooth operation is assumed to use the Extended Synchronous Connection-Oriented (eSCO) mode, as defined in the Bluetooth standard cited above. WLAN operation is assumed to use the Unscheduled Power Save Delivery (UPSD) mode, as defined in the IEEE 802.11 standard.

Reference is now made to FIG. 3. Terminal 22 communicates in accordance with a super-frame 68, which is repeated cyclically. Super-frame 68 comprises twenty-four time slots 72, denoted S1 . . . S24. Each time slot 72 is 625 μS long, a duration that is selected to match the 625 μS duration of Bluetooth time slots. Each super-frame is 15 mS long. The 15 mS duration of the super-frame is selected because it corresponds to twenty-four Bluetooth slots, as well as to three 5 mS WiMAX frames. The three WiMAX frames in the super-frame are denoted N, N+1 and N+2.

Some of time slots 72 are reserved for a particular link out of the WiMAX, WLAN and Bluetooth links. Other time slots are defined as bandwidth opportunities, or optional slots, in which the terminal can communicate using one of the links, as long as no other link already uses the slot.

In some cases, the individual WLAN, WiMAX and/or Bluetooth baseband units may not be aware of the structure of the super-frame shown in FIG. 3. In these cases, the individual baseband units are controlled on a slot-by-slot basis by processor 64, which coordinates their transmission and reception periods according to the super-frame structure. In order to align the timing of all three baseband units, the time base of the WiMAX baseband unit is used as a reference, and the time bases of the Bluetooth and WLAN baseband units are configured to track it.

The coexistence processor enables each baseband unit to use its designated time slots using "busy" interfaces or lines, also referred to herein as coexistence interfaces. In each time slot 72, the coexistence processor indicates to each baseband unit whether the current slot is free or busy using this interface. Processor 64 may indicate to a particular baseband unit that a slot is busy either when the super-frame structure defines the slot as blocked for use in the particular protocol, or when the slot is an optional slot that was already seized by another baseband unit. The processor may schedule the use of optional time slots among the baseband units using a Round-Robin priority mechanism or using any other suitable method.

When a particular baseband unit requests to communicate, it polls its "busy" interface in order to determine whether it is allowed to use the current time slot. If allowed, the baseband unit in question sets the interface to "busy." When the transmission is complete, the baseband unit releases the interface.

A slot allocation 76 defines the time slots assigned to Bluetooth operation. The assignment of Bluetooth slots takes precedence over the other two protocols. Bluetooth slots are defined at frequent, regular intervals, since the Bluetooth protocol has little flexibility in defining slot patterns. More-over, precedence is given to Bluetooth transmissions in order to reduce the latency and jitter of the voice carried over the Bluetooth link.

In the Bluetooth link configuration, terminal 22 (or, more specifically, the Bluetooth baseband unit of terminal 22) is assumed to be the master and headset 28 is assumed to be the slave, so that the timing of the Bluetooth link can be determined by terminal 22. Being the master, terminal 22 controls the timing of the Bluetooth slots and aligns them with the timing of the super-frame. When the Bluetooth link is initially set up with the headset being the master, the master and slave roles can be reversed using master-slave switching (MSS) or link disconnect/connect procedures, which are defined in the Bluetooth standard.

In the Bluetooth eSCO mode, terminal 22 and headset 28 transmit and receive in adjacent time slots. In the present example, each side of the Bluetooth link transmits once every six time slots. The terminal transmits to the headset in slots S1, S7, S13 and S19 marked as "M" and the headset transmits to the terminal in slots S2, SB, S14 and S20 marked as "S." Slots S9 . . . S12 and S23 . . . S24 are blocked for Bluetooth operation, in order to enable access to the other protocols.

Slots S3 . . . S6, S15 . . . S18 and S21 . . . S22 are defined as optional bandwidth opportunities, or optional slots, in which Bluetooth information can be transmitted if the slot is free. The optional slots can be used, for example, for non-voice information, such as for exchanging data packets with an additional Bluetooth-enabled laptop computer.

A slot allocation 80 defines the time slots assigned to WiMAX operation. In WiMAX, downlink and uplink bandwidth (i.e., WiMAX subcarriers and symbol intervals) is allocated using a MAP message, which is transmitted by the WiMAX BS at the beginning of each WiMAX frame. The MAP message comprises downlink MAP and uplink MAP messages. The downlink MAP allocates bandwidth in the current WiMAX frame, whereas the uplink MAP allocates bandwidth in the next frame. For example, the MAP message transmitted in the WiMAX frame denoted N+1 allocates the downlink bandwidth of frame N+1 and the uplink bandwidth of frame N+2.

The super-frame structure is defined so that the terminal is able to receive MAP messages from the BS. Furthermore, time slots for WiMAX uplink transmission are allocated so that they coincide with the uplink periods (uplink sub-frames) of the WiMAX frames.

In the present example, slots S9 . . . S12 of each super-frame are allocated for WiMAX downlink operation (WiMAX reception at the terminal). As can be seen in FIG. 3, these slots correspond to the first 2.5 mS of WiMAX frame N+1. The terminal is able to receive the MAP message transmitted in frame N+1, as well as data bursts, during this 2.5 mS period. Since the downlink MAP defines allocations for the current frame, the BS is expected to send any data bursts addressed to terminal 22 during the first 2.5 mS of the second frame of the super-frame.

In some embodiments, the WiMAX BS is aware of the fact that terminal 22 is a multi-function terminal that operates in accordance with a 15 mS super-frame structure. The BS is also aware of the timing of the super-frame, and transmits bandwidth allocations for this terminal only in the MAP messages of the second WiMAX frame in each super-frame. In particular, the BS sends uplink allocations for frame N+2 in the MAP message of frame N+1. Therefore, the end portion of frame N+2 (i.e., slots S23 and S24, and sometimes some or all of slots S21 and S22) are allocated to possible WiMAX uplink operation (WiMAX transmission from the terminal).

Note that the beginning of the interval reserved for WiMAX uplink does not necessarily coincide with the timing of slots 72.

Slots S1 . . . S8 and S13 . . . S20 (i.e., WiMAX frame N, the second half of frame N+1 and the first half of frame N+2) are blocked to WiMAX operation, and the BS is assumed to be aware of these blocked time intervals. Thus, the BS refrains from transmitting downlink data and allocating uplink bandwidth to the terminal during these periods.

In alternative embodiments, the WiMAX BS need not be aware of the super-frame structure and timing used by terminal 22. For example, the terminal (or, more specifically, the WiMAX transceiver of the terminal) may switch to sleep mode during the periods that are blocked to WiMAX operation, and notify the BS of this fact. The terminal can use, for example, class 1 or 2 sleep mode, as defined in the IEEE 802.16e standard, for this purpose.

A slot allocation 84 defines the time slots assigned to WLAN operation. The WLAN connection between terminal 22 and AP 24 is assumed to use the UPSD mode. Operation in the UPSD mode is chosen because it gives the terminal control over the timing of transmission and reception, thus enabling the terminal to coordinate the timing of its WLAN link with the timing of the Bluetooth and WiMAX links. In some embodiments, such as when the latency of AP 24 is higher than 2.5 ms, a longer super-frame (e.g. 30 ms) can be used in order to enable insertion of WLAN UPSD traffic.

In the UPSD mode, the terminal (or, more specifically, the WLAN transceiver of the terminal) is in sleep mode by default. The terminal controls the timing in which it wakes up, transmits, receives and returns to sleep. Whenever the terminal wakes up to transmit an uplink transmission, it polls the WLAN AP in order to receive any pending downlink data. If the pending downlink data exceeds the capacity of the allocated time slots, the terminal receives and acknowledges only part of the data. The terminal typically signals the AP to stop sending additional downlink data by refraining from sending uplink acknowledgments. The unacknowledged data is buffered by the AP until bandwidth is available. The terminal can also wake up in order to synchronize with the AP and to transmit and receive WLAN management traffic.

As can be seen in the figure, slots S3 . . . S6 and S15 . . . S16 are dedicated to WLAN uplink and downlink operation. Slots S17 . . . S18 and S21 . . . S22 are defined as optional bandwidth (OP) slots. Slots S1 . . . S2, S7 . . . S14, S19 . . . S20 and S23 . . . S24 are blocked to WLAN operation.

Relaxing Constraints on the WiMAX BS Using Bluetooth eSCO Retransmission Mechanism In the slot allocation of FIG. 3, terminal 22 receives downlink WiMAX transmissions during slots S9 . . . S12, i.e., in the first 2.5 mS of the second WiMAX frame of super-frame 68. This time interval does not cover the entire WiMAX downlink sub-frame (denoted DL[N+1] in the figure), which in the present example continues for another ~700 µS. (The relevant region is highlighted by a circle in the figure.) The fact that the terminal does not receive the full WiMAX downlink sub-frame adds constraints to the operation of the WiMAX BS.

For example, when the BS constructs the downlink sub-frame, which typically comprises downlink messages addressed to multiple terminals, the BS should position any messages addressed to terminal 22 in the first 2.5 mS of the downlink sub-frame. This constraint limits the flexibility of the BS in allocating downlink resources, and complicates the downlink sub-frame construction process. When the BS communicates with multiple multi-function terminals 22, and/or when a large amount of downlink traffic is addressed to such terminals, the constraint may degrade the downlink performance.

As will be shown below, the constraints described above can be relaxed when the Bluetooth link between terminal 22 and headset 28 operates using the eSCO operational mode, by using the retransmission mechanism of this mode.

Reference is now made to FIG. 4, which illustrates an alternative super-frame 85. In super-frame 85, Bluetooth slots are allocated in accordance with a slot allocation 86, and WiMAX reception and transmission is carried out in accordance with a slot allocation 88.

Unlike super-frame 68 of FIG. 3 above, in slot allocation 86 of super-frame 85 the terminal receives WiMAX transmissions during a 3.75 mS interval spanning slots S9 . . . S14, which covers the entire WiMAX downlink sub-frame DL[N+1]. As shown in allocation 86, these slots are blocked to Bluetooth operation. The WiMAX specification defines various downlink/uplink ratios, i.e., various lengths of the downlink sub-frame. In all of these ratios, however, the length of the downlink sub-frame does not exceed 3.75 mS. Thus, when slots S13 and S14 are assigned to WiMAX downlink communication, the WiMAX BS may position downlink messages to terminal 22 anywhere within the downlink sub-frame, without constraints.

In some embodiments, terminal 22 uses the retransmission mechanism of the Bluetooth eSCO mode to prevent slots that overlap with the WiMAX downlink sub-frame from being used for Bluetooth transmission. Coexistence processor 64 artificially triggers the retransmission mechanism by inhibiting the Bluetooth transmission of the terminal in these slots. Processor 64 inhibits the Bluetooth transmission by controlling Bluetooth baseband unit 52 and/or RF unit 56, using methods that are described further below.

When terminal 22 detects that it does not receive response from Bluetooth headset 28, it carries out retransmission in the subsequent slot. Thus, Bluetooth transmissions are deferred, using the inhibition and retransmission mechanisms, to the slots that do not overlap the downlink sub-frame of the WiMAX frame, typically without loss of Bluetooth information.

The coexistence processor may inhibit the Bluetooth transmission is several ways. For example, some Bluetooth baseband devices have a shutdown or inhibit input, which enables inhibiting their transmission using an external signal. The coexistence processor may inhibit the Bluetooth transmission by applying an inhibiting signal to such an input. Alternatively, the coexistence processor may inhibit PA 60 in RF unit 56, such as by switching off the PA power supply, modifying a bias voltage of the PA, switching off the RF input or RF output of the PA, or using any other means. Further alternatively, the coexistence processor may use any other method for inhibiting Bluetooth transmission during time slots that overlap the downlink sub-frame of the WiMAX frame.

In some embodiments, terminal 22 is able to determine whether the downlink sub-frame contains a message addressed to the terminal that is positioned beyond the first 2.5 mS of the frame, and to inhibit the Bluetooth transmission in slots S13 and/or S14 only when necessary. If the WiMAX BS does not position any messages addressed to terminal 22 in slots S13 or S14, the coexistence processor assigns these slots to Bluetooth operation.

Since slots S13 and S14 were blocked to Bluetooth transmission, these transmissions are deferred to the next available slots, i.e., to slots S15 and S16. Thus, slot S15 is used for transmission of the Master (i.e., terminal 22) and slot S16 is used for transmission of the Slave (i.e., headset 28). From this point, the nominal slot allocation shown in FIG. 3 above is resumed, and the next Bluetooth transmissions occur in slots S19 and S20.

FIG. 5 is a flow chart that schematically illustrates a method for multi-function communication in wireless terminal 22, in accordance with an embodiment of the present invention. The method begins by aligning, or synchronizing, the various communication protocols of terminal 22 to the super-frame structure, at a frame alignment step 90. Terminal 22 and sometimes WiMAX BS 26 are notified of the super-frame structure. Coexistence processor 64 in terminal 22 carries out the allocation of the different slot types. Processor 64 allocates transmit and receive slots for the Bluetooth link, WiMAX uplink and downlink slots, and WLAN polling slots, at an allocation step 94.

Terminal 22 receives the WiMAX MAP messages, at a MAP reception step 98. In particular, the terminal receives and decodes the downlink MAP message transmitted in the second WiMAX frame of the super-frame.

The terminal checks whether the decoded downlink MAP message indicates that the WiMAX BS intends to transmit a downlink message to the terminal beyond the first 2.5 mS of the second WiMAX frame, i.e., in slots S13 and/or S14, at a checking step 102. If the downlink MAP message indicates that a downlink message is expected in slots S13 and/or S14, coexistence processor 64 inhibits Bluetooth transmission in these slots, at a Bluetooth blocking step 106. The coexistence processor may use any suitable method, such as the exemplary methods described above, for inhibiting Bluetooth transmission during slots S13 and/or S14. Processor 64 may block only slot S13, or both slots S13 and S14, depending on the timing of the allocated WiMAX downlink message.

If, on the other hand, no WiMAX downlink message is addressed to the terminal during slots S13 and S14, the coexistence processor assigns these slots to Bluetooth operation. Using the allocated slots, terminal 22 communicates simultaneously and without mutual interference with AP 24, BS 26 and headset 28 over the WLAN, WiMAX and Bluetooth links, respectively, at a communication step 110.

The super-frame structures shown in FIGS. 3 and 4 above are exemplary structures. In the present examples, the super-frames have a cyclic period of three WiMAX frames, of which one is inactive (sleep frame) and two are active (one used for downlink communication and one used for uplink communication). The methods and systems described herein can also be used, for example, with super-frame structures in which two frames are active and 1+3K frames are inactive, K denoting an integer value. Further alternatively, any other suitable slot allocation can also be used.

In some embodiments, terminal 22 may also communicate with headsets (or other Bluetooth peripherals) that do not support eSCO functionality, such as legacy peripherals that support Bluetooth Specification versions earlier than Version 1.2. When communicating with such a peripheral, terminal 22 may operate in accordance with the super-frame structure of FIG. 3 above, assigning slots S13 and S14 to Bluetooth operation. This type of operation may cause slight degradation in WiMAX downlink reception but will not compromise Bluetooth voice quality, which is often considered of higher importance.

Although the embodiments described herein mainly address coordination of WiMAX, WLAN and Bluetooth links in a single communication terminal, the principles of the present invention can also be used in coexistence between only two of these protocols. Generally, the methods and systems described herein can be used for coordinating the transmissions of any suitable long-range base-station protocol with any suitable local, short-range protocol, which supports retransmission. Furthermore, these principles may also be applied in coexistence schemes involving other sorts of wireless protocols, such as Ultra-WideBand (UWB) protocols, the protocols defined by the Third Generation Partnership Project (3GPP) Long Term Evolution (LTE), 3GPP2 Evolution-Data Optimized (EVDO) Rev C (UMB), the next generation Personal Handyphone System (XG-PHS) and the IEEE 802.20 High Speed Mobile Broadband Wireless Access (MBWA) specifications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
    allocating time intervals for establishing a first communication session over a first connection between a baseband processing circuit of a wireless terminal and a base station (BS) of a long-range wireless data network, which operates in accordance with a first communication protocol that defines a sequence of time frames for transmission between the wireless terminal and the BS;
    allocating time slots for establishing a second communication session over a second connection between the baseband processing circuit of the wireless terminal and a peripheral wireless device, which operates in accordance with a second, short-range time-slotted communication protocol, which is different from the first protocol and has a retransmission mechanism;
    synchronizing the time slots with the time frames defined by the BS;
    using the baseband processing circuit, transmitting data to the peripheral wireless device in time slots that are allocated to the second communication protocol but overlap the time intervals of the first communication protocol;
    using a coexistence processor, inhibiting transmission of the data from the baseband processing circuit in the time slots that overlap the time intervals;
    detecting in the baseband circuit an absence of a response from the peripheral wireless device due to inhibition of the transmission; and
    responsively to detecting the absence of the response, activating in the baseband processing circuit the retransmission mechanism of the second communication protocol so as to retransmit the data in one or more time slots that do not overlap the time intervals.

2. The method according to claim 1, wherein the baseband processing circuit includes a baseband unit for communicating over the second connection, and wherein inhibiting the transmission on the second connection comprises inhibiting the baseband unit.

3. The method according to claim 1, wherein the wireless terminal includes a Power Amplifier (PA) for amplifying Radio Frequency (RF) signals transmitted over the second connection, and wherein inhibiting the transmission on the second connection comprises inhibiting the PA.

4. The method according to claim 3, wherein inhibiting the PA comprises performing at least one action selected from a group of actions consisting of switching off a supply voltage of the PA, modifying a bias voltage of the PA, switching off an RF input of the PA and switching off an RF output of the PA.

5. The method according to claim 1, wherein inhibiting the transmission on the second connection comprises inhibiting the transmission responsively to determining that the BS intends to transmit data addressed to the wireless terminal during the time slots that overlap the time intervals.

6. The method according to claim 5, wherein determining that the BS intends to transmit the data comprises decoding an allocation message transmitted by the BS.

7. The method according to claim 1, and comprising establishing a third communication session over a third connection with an access point (AP) of a wireless local area network (WLAN) in accordance with a third protocol different from the first and second protocols, during time periods that do not overlap the time slots of the first connection and the time intervals of the second connection, and conducting the third communication session concurrently with the first and second sessions.

8. A wireless communication terminal, comprising:
    a radio frequency (RF) unit;
    a baseband processing circuit, which is coupled to cause the RF unit to transmit and receive signals over the air so as to establish a first communication session over a first connection with a base station (BS) of a long-range wireless data network, which operates in accordance with a first protocol that defines a sequence of time frames for transmission between the BS and the wireless terminal, and to establish a second communication session over a second connection between the wireless terminal and a peripheral wireless device, which operates in accordance with a second, short-range time-slotted communication protocol that is different from the first protocol and has a retransmission mechanism; and
    a coexistence processor, which is configured to allocate time slots for the second session, to allocate time intervals for the first session and to synchronize the time slots with the time frames defined by the BS,
    wherein the baseband processing circuit is configured to transmit data to the peripheral wireless device in time slots that are allocated to the second communication protocol but overlap the time intervals of the first communication protocol,
    wherein the coexistence processor is configured to inhibit transmission of the data from the baseband processing circuit in the time slots that overlap the time intervals,
    wherein the baseband processing circuit is configured to detect an absence of a response from the peripheral wireless device due to inhibition of the transmission, and, responsively to detecting the absence of the response, to activate the retransmission mechanism of the second communication protocol so as to retransmit the data in one or more time slots that do not overlap the time intervals.

9. The terminal according to claim 8, wherein the baseband processing circuit comprises a baseband unit for communicating over the second connection, and wherein the coexistence processor is configured to inhibit the transmission on the second connection by inhibiting the baseband unit.

10. The terminal according to claim 8, wherein the RF unit comprises a Power Amplifier (PA) for amplifying RF signals transmitted over the second connection, and wherein the coexistence processor is configured to inhibit the transmission on the second connection by inhibiting the PA.

11. The terminal according to claim 10, wherein the coexistence processor is configured to inhibit the PA by performing at least one action selected from a group of actions consisting of switching off a supply voltage of the PA, modifying a bias voltage of the PA, switching off an RF input of the PA and switching off an RF output of the PA.

12. The terminal according to claim 8, wherein the baseband processing circuit and the coexistence processor are configured to inhibit the transmission on the second connection responsively to determining that the BS intends to transmit data addressed to the wireless terminal during the time slots that overlap the time intervals.

13. The terminal according to claim 12, wherein the baseband processing circuit is coupled to detect that the BS intends to transmit the data by decoding an allocation message transmitted by the BS.

14. The terminal according to claim 8, wherein the baseband processing circuit is further arranged to establish a third communication session over a third connection with an access point (AP) of a wireless local area network (WLAN) in accordance with a third protocol different from the first and second protocols, and wherein the coexistence processor is arranged to allocate time periods for the third communication session that do not overlap the time slots of the first connection and the time intervals of the second connection, so as to conduct the third communication session concurrently with the first and second sessions.

* * * * *